Patented Nov. 27, 1951

2,576,502

UNITED STATES PATENT OFFICE 2,576,502

POLYMERS OF REACTION PRODUCTS OF ALKYL AMINES AND METHYLENE-BIS-METHACRYLAMIDE

Philip B. Dalton, New York, N. Y., assignor to Sun Chemical Corporation, New York, N. Y., a corporation of Delaware No Drawing. Application April 1, 1949,
Serial No. 85,040

2 Claims. (Cl. 260—89.7)

1

This invention relates to new organic materials.

In my patent application Serial No. 85,038, filed on even date herewith and now abandoned, there are described and claimed, as new polymerizable monomers, the methylene-bis-amides of unsaturated polymerizable acids, the said products corresponding to the general formula

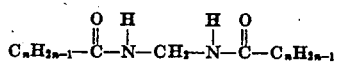

where $n$ is an integer of from 2 to 4.

I have found according to the present invention that certain new and useful products may be obtained by proper further reactions with these materials.

The above compounds contain in their molecular structure at least two reactive double bonds, such double bonds being present in each of the terminal $C_nH_{2n-1}$ groups, and can, therefore, be subjected to certain specific reactions, in accordance with the present invention, which lead by the formation of addition compounds to saturation of only one of the available unsaturated reactive groups. Such products may be represented by the formula

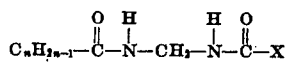

where X is an addition product of $C_nH_{2n-1}$, and where $n$ is an integer of from 2 to 4, as described and claimed in my copending application filed on even date herewith, Serial No. 85,039.

The addition products thus obtained, namely those in which only one of the terminal $C_nH_{2n-1}$ groups has been saturated by the formation of an addition compound, may be further treated to effect polymerization of such materials to furnish valuable resinous materials which may be employed in various arts in which such materials find application, for instance, as coating materials for paper, wood, metal and cloth.

Similarly, as has been set forth in my previously mentioned patent application, Serial No. 85,038, the methylene-bis-amides of such unsaturated polymerizable acids as those corresponding to the general formula $C_nH_{2n-2}O_2$ where $n$ is an integer of from 3 to 5 may also be treated to effect polymerization of the said compounds by forming cross linkage between the unsaturated terminal $C_nH_{2n-1}$ groups.

The polymerized materials of the present invention may be described as polymerization products of compounds of the general formula

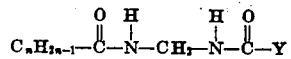

where Y is a radical selected from the group consisting of $C_nH_{2n-1}$, and addition products of $C_nH_{2n-1}$, where $n$ is an integer of from 2 to 4.

2

As described in my above identified application, Serial No. 85,038, methylene-bis-methacrylamide may be prepared as follows: 10 parts of methacrylamide are dissolved in 35 parts of water at a temperature of approximately 40° C., and 0.01 part of copper sulfate are added thereto as a polymerization inhibitor. To this solution there are added 1.5 parts of concentrated sulfuric acid (95%) and 4.8 parts of 37% formalin. The reaction mixture is thereupon heated in a suitable reaction vessel to a temperature of 100° C. and is refluxed for a period of time sufficient to effect substantially complete reaction of the reacting constituents, a reflux period of approximately 15 minutes usually being sufficient to effect substantially complete reaction. The reaction mixture is then permitted to cool to a temperature of approximately 60° C. whereupon a white crystalline precipitate forms, which satisfactorily may be separated by filtration and further purified by recrystallization from hot water. The material thus obtained corresponds to the formula

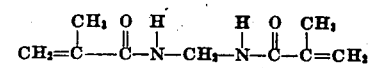

As is further described in my above identified application Serial No. 85,038, similar products may be secured using as starting materials the amides of such unsaturated polymerizable acids as are represented by the formula $C_nH_{2n-2}O_2$, in which $n$ is an integer of from 3 to 5.

Acids corresponding to the above formula which may satisfactorily be employed in preparing such compounds include such acids, as acrylic, methacrylic, crotonic, vinyl acetic, angelic and such other acids which are polymerizable as such or in the form of their derivatives such as their esters, amides, nitriles, etc.

The materials obtained in accordance with the above outline procedure may be subjected to polymerization reactions to form valuable resinous reaction products.

Illustrative of the preparation of such polymer materials is the following example:

Example 1

An aqueous solution of methylene-bis-methacrylamide is treated with a 30% aqueous solution of hydrogen peroxide in an amount containing approximately 0.3% hydrogen peroxide based on the weight of the methylene-bis-methacrylamide, and the solution is heated to boiling. Upon such treatment a white polymer material is formed which precipitates from solution.

Another aspect is the preparation of addition products of the polymerizable unsaturated monomers described and claimed in my application, Serial No. 85,038, filed on even date herewith, in which only one of the terminal unsaturated reactive groups is converted into a saturated grouping by suitable reaction. A variety of different materials can be employed to effect such reaction with the terminal unsaturated groups of the methylene-bis-amides of the said patent application, Serial No. 85,038. Illustrative of some of the materials which will react are compounds such as sodium bisulfite, alcohols, halogens, conjugated diolefins, amines, compounds having an active hydrogen, hydrogen sulfide and mercaptans.

The addition products above set forth may be obtained by reacting equimolecular amounts of a methylene-bis-amide of a polymerizable unsaturated acid, said acid belonging to the group having the general formula $C_nH_{2n-2}O_2$ where $n$ is an integer of from 3 to 5, and a modifying reacting material of the group above set forth under reaction conditions described hereinafter in several illustrative examples. The reactions are carried out in the presence of a small amount of a polymerization inhibitor an amount of such polymerization inhibitor corresponding to approximately 0.2 part by weight of the reacting ingredients being adequate for such purpose. As polymerization inhibitors, there may be employed copper sulfate, copper wire, freshly precipitated metallic copper, or an organic compound such as hydroquinone.

By selectively effecting the reaction between the modifying materials above set forth and the methylene-bis-amides of my application, Serial No. 85,038, such that saturation of only one of the terminal unsaturated groups of the said methylene-bis-amides becomes saturated, the resulting addition products are capable of undergoing further reaction involving polymerization of the addition product by cross linkage between the available unreacted unsaturated groups to form valuable resinous products. The properties and characteristics of such polymers will vary with, and depend upon in part, the particular modifying reacting material employed to effect saturation of one of the unsaturated groups of the monomers prior to polymerization.

Illustrative of examples setting forth this aspect are the following.

Example 2

To 2 parts of methylene-bis-methacrylamide dispersed in 50 parts of water and in the presence of 0.2 part of copper sulfate, there is added, with stirring and at normal room temperatures, a solution of 1.2 parts of sodium bisulfite in 24 parts of water. Agitation of the reaction mixture is continued for a period of approximately 5 hours and the mixture is thereafter allowed to stand for approximately 12 hours. After settling, the reaction mixture is filtered to remove impurities and the filtrate is distilled to dryness at a temperature of approximately 40° C. and under vacuum conditions. The residue from such distillation is then purified by recrystallization from a water-alcohol mixture, being obtained in the form of white powdery crystals. The material so obtained is the sodium bisulfite addition product of methylene-bis-methacrylamide and corresponds to the formula

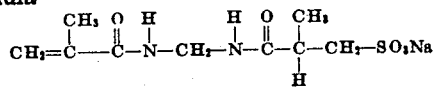

This product melts with decomposition at 315° C.

Example 3

The sodium bisulfite addition product of methylene-bis-methacrylamide may be treated in solution with a 30% aqueous hydrogen peroxide solution, and the resultant solution heated to boiling to effect polymerization thereof. An amount of hydrogen peroxide equivalent to approximately 0.3% by weight of the dissolved addition product is satisfactorily employed for such purpose. The polymerization product thus formed is an insoluble resinous material.

Example 4

Three parts of methylene-bis-methacrylamide dispersed in 60 parts of water, together with 0.2 part copper sulfate are charged to a suitable reaction vessel, and 1.2 parts of diethylamine are added thereto. The reaction mixture is then heated to 90° C. over approximately a ten minute period and thereafter allowed to cool. After cooling, the reaction mixture is filtered to remove impurities and is then allowed to stand for two days, during which time a white crystalline material settles out. The material thus obtained is the diethylamine addition product of methylene-bis-methacrylamide corresponding to the formula

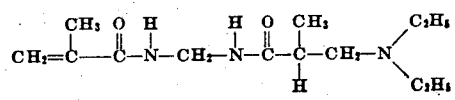

This material does not have a clear melting point as does methylene-bis-methacrylamide but polymerizes instead on heating.

Example 5

Aqueous solutions of the addition product of Example 4 may be polymerized to an insoluble resinous material upon treatment with a 30% aqueous hydrogen peroxide solution. The conditions of reaction for such polymer formation may be similar to the conditions set forth in Example 3.

Other amine addition products may also be prepared in accordance with the invention outlined in my copending patent application Serial No. 85,039, by substituting, in equivalent molecular proportions, other primary and secondary aliphatic amines for the diethylamine in the reaction outlined in Example 4. Such other amines which may be employed to prepare the addition products, which by the reactions outlined in the present invention may be polymerized to form valuable resinous products, include, for example, methylamine, ethylamine, dimethylamine and the higher primary and secondary amines such as decylamine, octadecyl methyl amine, etc.

Similarly, other bisulfite addition products may also be prepared by substituting, for example, potassium bisulfite in equivalent molecular proportions for the sodium bisulfite in the reaction outlined in Example 2.

While the above products and the processes of making the same constitute preferred embodiments of the present invention, changes may be made therein without departing from the scope of the present invention, as defined in the appended claims.

What is claimed is:

1. As a new product, a polymer of a compound having the formula

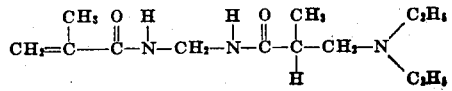

2. As a new product, a polymer of a compound having the formula
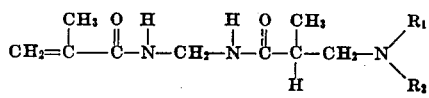
where R₁ is a member of the group consisting of hydrogen and an alkyl radical, and where R₂ represents an alkyl radical.
PHILIP B. DALTON.
REFERENCES CITED
The following references are of record in the file of this patent:
UNITED STATES PATENTS
| Number | Name | Date |
|---|---|---|
| 2,132,671 | Bauer | Oct. 11, 1938 |
| 2,173,005 | Strain | Sept. 12, 1939 |
| 2,475,846 | Lundberg | July 12, 1949 |
| 2,478,378 | Dickey | Aug. 9, 1949 |